Sept. 2, 1969    J. E. McWILLIAMS    3,464,572
APPARATUS FOR LOADING BAGGED MAIL FROM A LOADING
DOCK INTO A HIGHWAY VEHICLE
Filed March 12, 1968                                    5 Sheets-Sheet 1
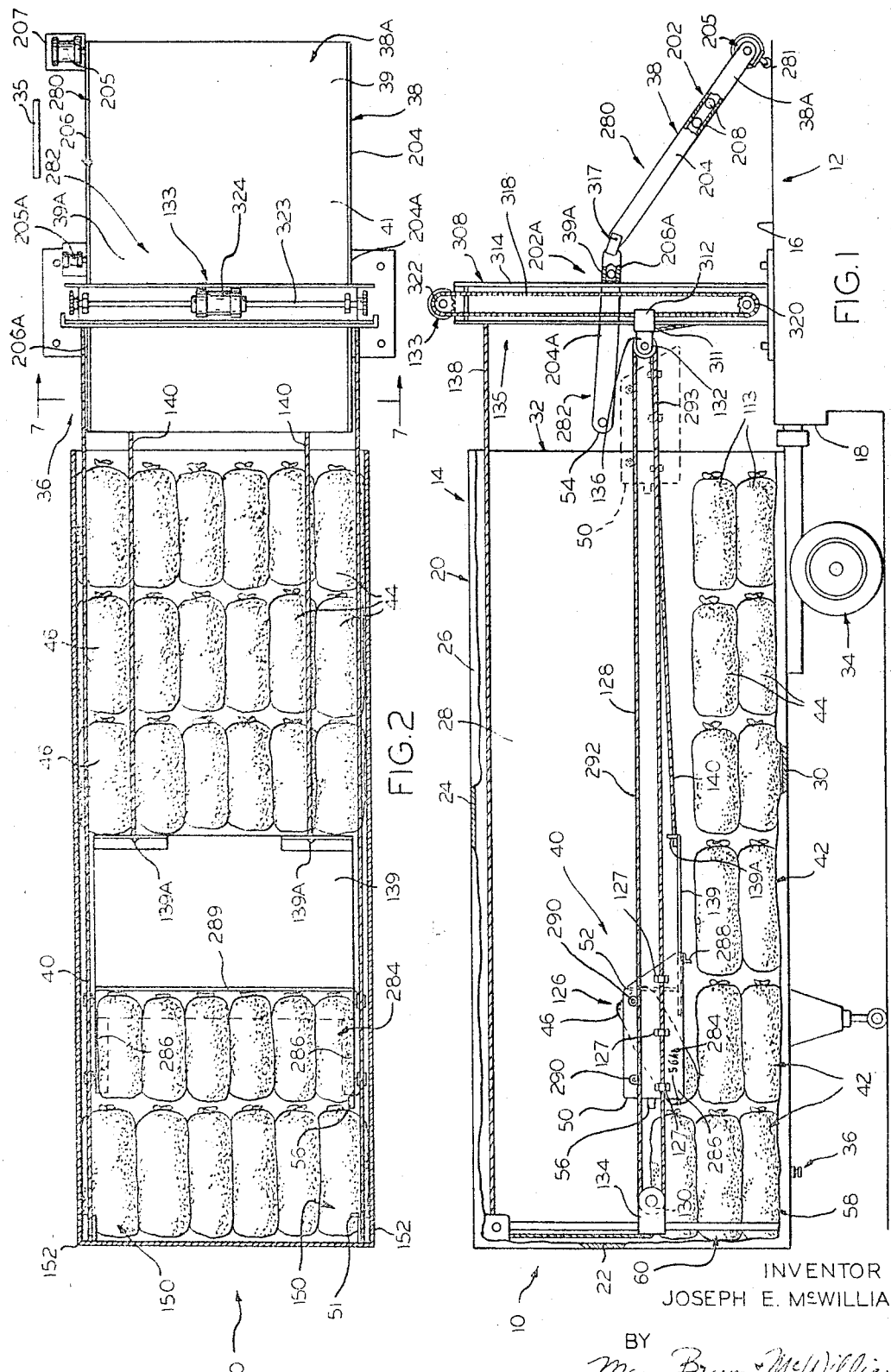
INVENTOR
JOSEPH E. McWILLIAMS
BY
Mann, Brown & McWilliams
ATTORNEYS

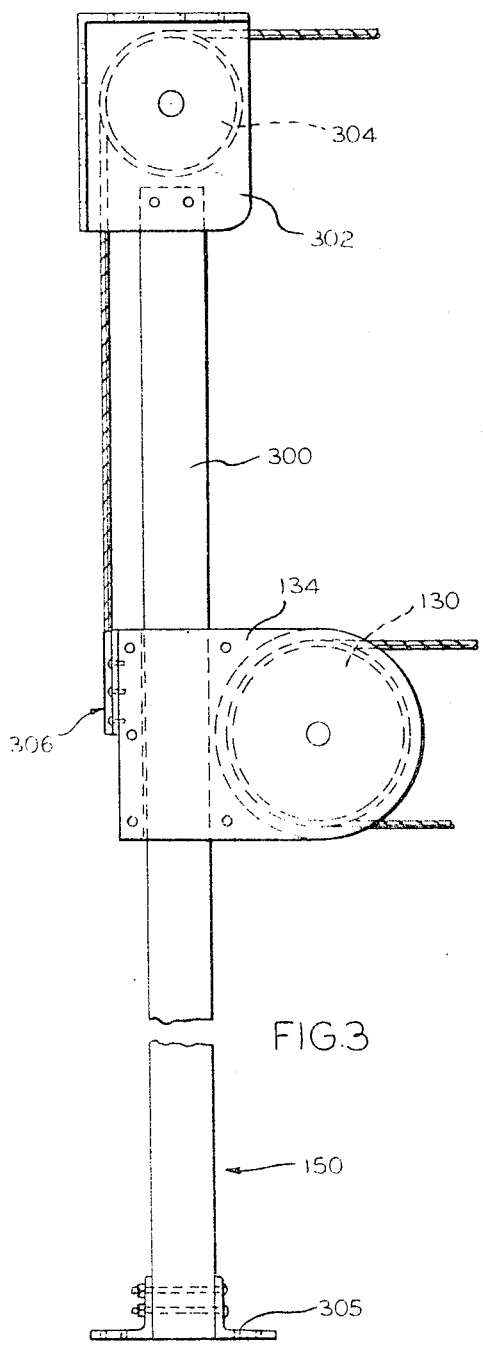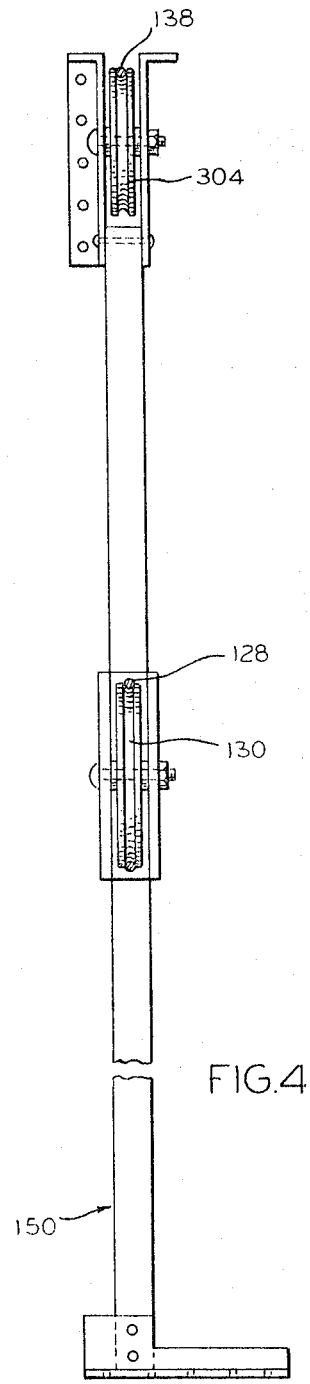

Sept. 2, 1969  J. E. McWILLIAMS  3,464,572
APPARATUS FOR LOADING BAGGED MAIL FROM A LOADING
DOCK INTO A HIGHWAY VEHICLE
Filed March 12, 1968  5 Sheets-Sheet 4

INVENTOR
JOSEPH E. McWILLIAMS

BY *Mann, Brown & McWilliams*
ATTORNEYS

United States Patent Office 3,464,572
Patented Sept. 2, 1969

3,464,572
APPARATUS FOR LOADING BAGGED MAIL FROM A LOADING DOCK INTO A HIGHWAY VEHICLE
Joseph E. McWilliams, 1345 Canterbury Lane, Glenview, Ill. 60025
Continuation-in-part of application Ser. No. 694,151, Dec. 28, 1967. This application Mar. 12, 1968, Ser. No. 712,558
Int. Cl. B65g 65/00, 67/00
U.S. Cl. 214—6                7 Claims

ABSTRACT OF THE DISCLOSURE

The invention relates to the loading of mail bags from a loading dock into an end loading highway vehicle, such as a truck or a trailer, to fully load the vehicle with stacks of mail bags in which the bags are compactly loaded into place in individual stack forming tiers without those performing the bag loading operation having to enter the vehicle. In practicing the invention, the loading dock at the post office or the like is provided with a conveyor on which out-going bags are placed and oriented in closely spaced tier form to form a stack forming tier unit. Operating between the conveyor and the highway vehicle is a carriage, in the form of a carrier suspended between vertically movable horizontally disposed conveyors that are temporarily suspended between the dock and the forward end of the vehicle, which carrier receives the tier load without disturbing the orientation of the bags and brings the tier load into the vehicle loading area for discharge of the stack forming tier unit, and effects placement of the tier as part of a stack in the vehicle, again without disturbing the orientation of the bags. The carriage then returns to the conveyor for another tier load.

The carriage movements are controlled so that the individual tier loads are formed into vertical stacks of mail bags that are disposed to position the bags of adjacent stacks in closely spaced relation, with the vehicle being thus filled with bags throughout its load receiving area so as to make maximum use of the available loading space within the vehicle to maximize the pay load. The operation of the carriage is mechanized so that workers do not have to go into the vehicle, the palleting of the bags in groups is avoided while still achieving uniform loading in tier form.

---

This application is a continuation-in-part of my application Ser. No. 694,151, filed Dec. 28, 1967.

This invention relates to a method and apparatus for loading bagged mail from a loading dock into a highway vehicle, and more particularly, to methods of and means for facilitating the handling of bagged mail in tiered groups for purposes of loading same into vehicles that are to transport it.

Conventional methods of loading mail bags into highway vehicles and trailers of the end loading type are not only time consuming and inefficient in nature, but also require much manual effort on the part of the workers involved. The bags are conventionally loaded so as to form vertical stacks in which the bags of each stack extended longitudinally of the vehicle and the stacks fill all available space vertically and lengthwise of the vehicle. The bags, which when loaded are from 12-14 inches wide and 36-40 inches long, are usually loaded up to about 92 inches above the floor of the truck in a space that is about eight feet wide, with the length depending on the length of the truck.

Heretofore the loading procedures have been largely manual in nature, with the workers involved dragging the individual bags into the vehicle from a pile of the bags on the adjacent loading dock, and then individually positioning and lifting the bag as is necessary to complete the formation of the respective bag stacks. At best, hand carts are sometimes employed to reduce some of the manual effort involved, but the handling required of each individual bag is still much the same; in both cases, much repetition of bag orienting movements is required for each bag, which is wasteful of effort and inefficient in terms of the time and cost of getting the job done. The result is that valuable equipment is unduly tied up to accommodate these slow loading procedures, and labor is in short supply as workers are becoming increasingly reluctant to take on jobs involving such hard work.

Nevertheless, the Post Office Dpartment and othrs concerned with the transport of loaded mail bags, load something on the order of 50,000 trucks a day in the U.S.A. in this manner at a cost on the order of $18.00 a truck, which gives an indication of the magnitude of the problem.

My Patent 3,164,271, granted Jan. 5, 1965, discloses a basic system for handling bagged mail which involves the sorting and loading of incoming bags into tier load units that are grouped by destination and stored until arrival of a suitable load transport vehicle whereupon the tier load units are unloaded in single or multiple tier form in the vehicle.

A principal objective achieved by the methods and apparatus disclosed in said patent is that the mail bags are oriented early in the cycle of their handling operations and this initial orientation is maintained throughout all of the subsequent handling operations.

The present application is directed to the specifics of the arrangement shown in FIGURES 10–13 of my said application.

A principal object of the present invention is to provide methods and apparatus for further facilitating the loading of end opening vehicles without requiring that the operator enter the transport vehicle or that the mail bags be palleted in groups to reduce individual handling.

Another principal object of this invention is to provide a method of loading bagged mail in transport vehicles in closely spaced relationship to the end that the available air spaced within the vehicle will be loaded to the maximum and all manual motions ordinarily required to handle the bags within the vehicle are performed by mechanical means arranged to carry, elevate as necessary and deposit the bags in the compact relationship necessary to maximize the pay load by substantially filling the available cubic loading space of the vehicle.

Another principal object of the invention is to provide methods and apparatus for loading of end opening vehicles such as motor trucks and trailers which permits a single operator to efficiently load the entire transport vehicle without stepping inside it.

Still other objects of the invention are to provide apparatus for loading bagged mail in transport vehicles that is adapted for full push button type actuation and control, to provide methods and apparatus for handling bag mail that permits substantially automatic handling of the mail in tiered load groups, and to provide mail bag handling apparatus that is economical of manufacture, convenient in use, and adapted for all conventional mail bag loading dock areas and vehicles or their equivalents.

Other objects, uses, and advantages will be obvious or become apparent from a consideration of the following detailed description and the application drawings.

In the drawings:

FIGURE 1 is a diagrammatic side elevational view of a semi-trailer in the process of being loaded in accordance with my present invention, with parts being broken away, and the mail bag tier carrying carriage being shown in its load receiving position in its dashed line position while its full line position shows one of the load discharging positions thereof;

FIGURE 2 is a plan view of the apparatus shown in FIGURE 1, with the suspended carriage being shown in its load unit discharging position;

FIGURE 3 is a view substantially along line 3—3 of FIGURE 2, better illustrating one of the vehicle mounted cable supporting props that forms a part of the mechanism for vertically shifting the loading supporting carriage;

FIGURE 4 is a side elevational view of the prop shown in FIGURE 3, looking from the right hand side of FIGURE 3;

FIGURES 8 and 9 are a plan view and a side elevational view, respectively, of the cable support frame of FIGURE 7.

Figure 5:
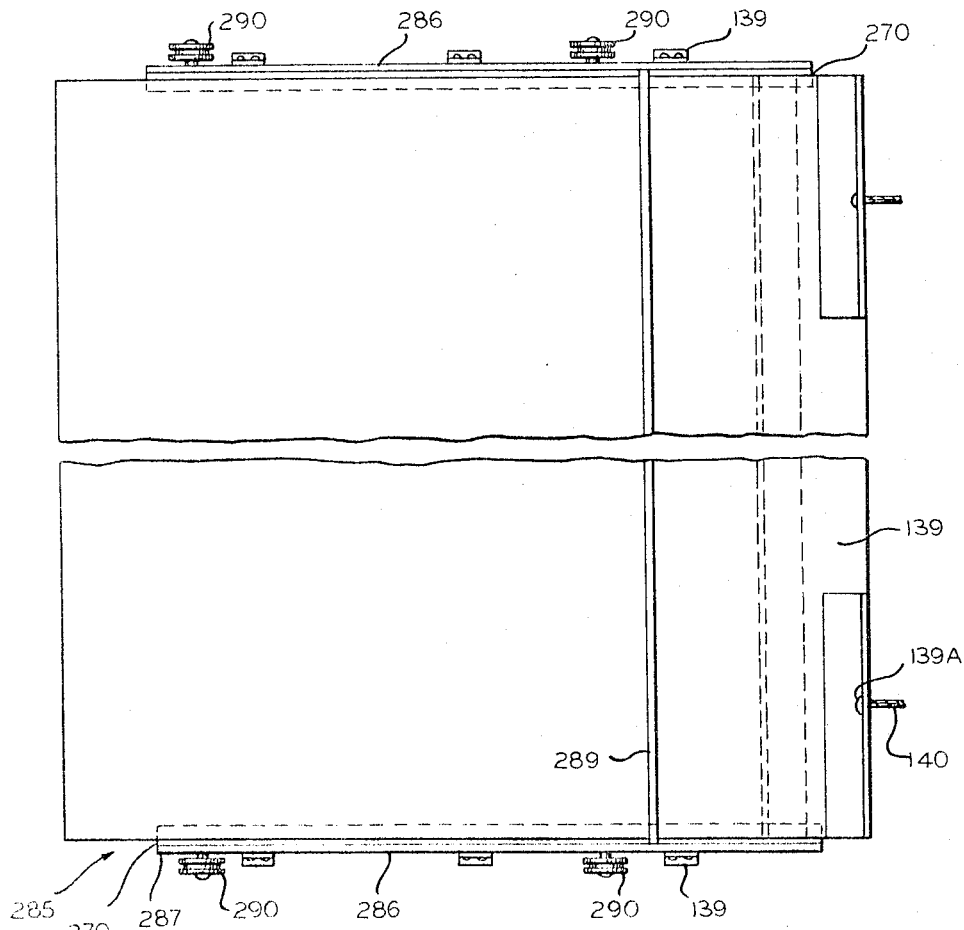
FIGURE 5 is a plan view of the carrier that comprises the load support carriage of FIGURES 1 and 2.

However, it is to be distinctly understood that the specific embodiments of the invention illustrated are supplied primarily to comply with the requirements of the Patent Code, and that the invention may have other embodiments.

GENERAL DESCRIPTION

Reference numeral 10 of FIGURES 1 and 2 generally indicates one embodiment of the present invention that incorporates the basic approach of my said application Ser. No. 694,151 for loading mail bags from a loading dock 12 into an end loading vehicle 14, which has been illustrated as being in the form of the familiar semi-trailer, although the invention is readily applicable to any end loading vehicle.

It is assumed that the mail bag handling installation involved includes the loading dock 12 (of a post office or the like) that is conventionally provided with a level load support surface 16 and the usual shoulder or end 18 against which the vehicle 14 is backed up for purposes of being loaded.

It is also assumed that the vehicle 14 be in the form of the usual body 20 defined by forward end wall 22, top wall 24, side walls 26 and 28, floor 30, and end opening 32 that is customarily closed by suitable doors or the like (not shown). The body 20, being of the semi-trailer type, rides on the usual rear wheels 34 and is provided with the usual kingpin 36 for connection to the fifth wheel of a conventional tractor truck (not shown).

In accordance with this invention, there is associated with the loading dock 12 at the position 36 where the vehicle body 14 is to be stationed for loading purposes a mail bag receiving conveyor 38 and a mail bag tier conveying carriage 40, which receives the mail bags accumulated in tier form or conveyor 38, transports them into the vehicle 14 and discharges them in tier form to form mail bag stacks 42.

Under ordinary circumstances, the loading dock 12 is located at a post office or the like where loaded mail bags are processed for shipment to their destinations, and as indicated in FIGURE 2, the conveyor 38 and the carriage 40 are longitudinally aligned with the vehicle 14 (in the loading position of the vehicle) and have a width transversely thereof to accommodate enough mail bags 44 laid side by side in a row to form one complete tier 46 of a stack 42, such that when the tier is placed within the vehicle 14, it will extend substantially from one side wall 26 to the other side wall 28 as indicated in FIGURE 2. Conveyor 38 is in the form of conveyor belt 39 defining an upwardly facing load supporting surface 41 on which the bags 44 are placed, which surface, at least at the lower, loading end 38A of conveyor 38, is at an easy reach height above surface 16, such as two to three feet high.

Figure 9:
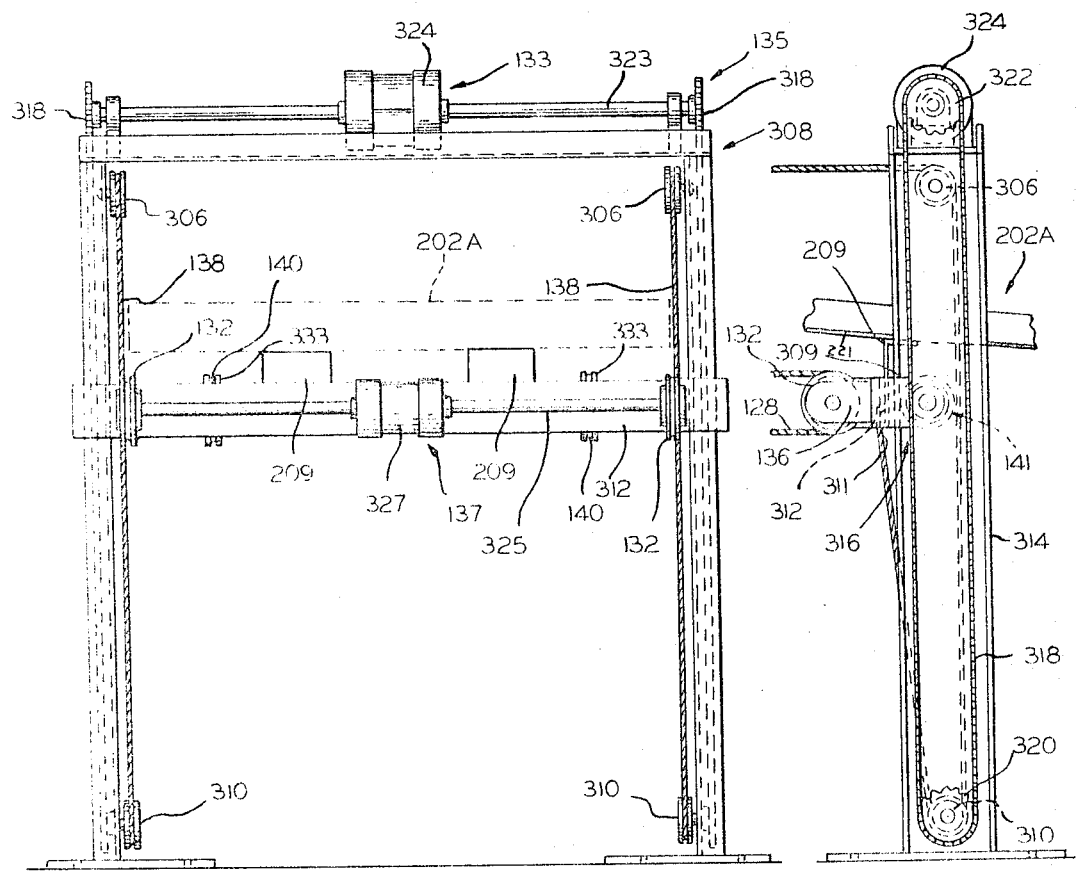

The carriage 40 comprises a load support in the form of a carrier 126 suspended between cables 128 mounted on either side of the vehicle in the form of closed loops and trained over suitable end pulleys 130 and 132. Pulleys 130 and 132 are respectively journalled in the respective vertically movable supports 134 and 136 which are horizontally aligned and simultaneously raised and lowered by operation of cables 138 by power mechanism 133 which is associated with the control mechanism 135 best illustrated in FIGURES 7–9. The carrier 126 is fixed to the respective cables 128 at lugs 127 and the cables 128 are powered by a suitable drive mechanism 137 (FIGURES 7–9) to cycle the carriage 40 forwardly and rearwardly of the vehicle. The carrier 126 of FIGURES 1–6 forming the carriage 40 is formed with a retractable shelf or slide plate 139 on which a mail bag tier 46 is placed by operating the conveyor 38, and when the carrier 126 is positioned to dispose the tier of bags over the spot they are to be dropped into in accordance with this invention, the shelf 139 is drawn to the discharging position shown in FIGURE 1 by pulling on cables 140 through suitable mechanism 141 (FIGURE 8) under the control of the operator (without moving the carriage 40 rearwardly of the vehicle).

Figure 10:
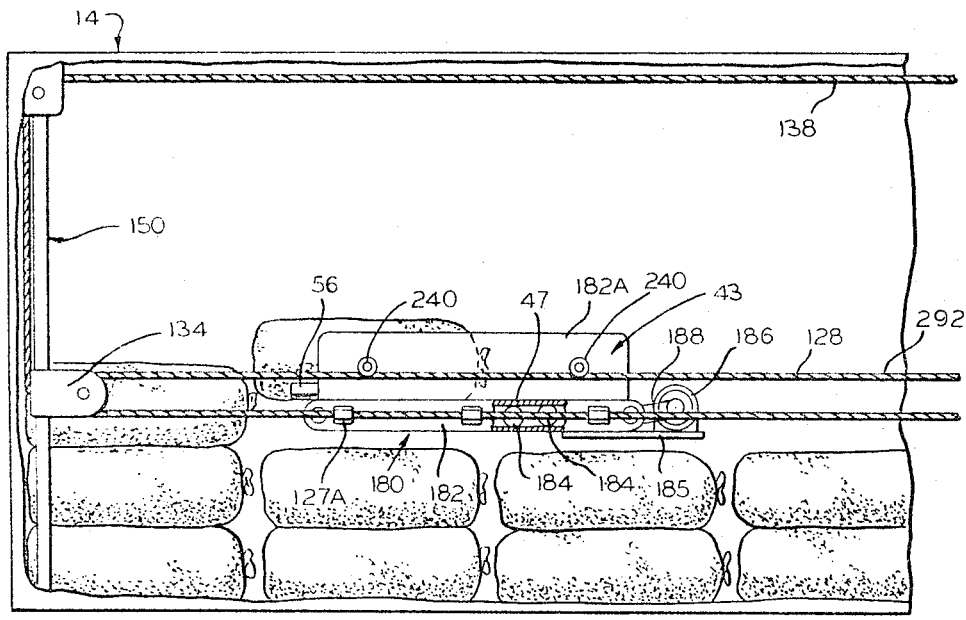
FIGURE 10 is a view similar to that of FIGURE 1 illustrating a variant embodiment of this invention.

In the variant form 10A shown in FIGURE 10, the carriage 40A is actuated in the manner illustrated in FIGURES 1–9 but comprises a load support in the form of conveyor 43 that is powered for discharging the mail bag tiers 46 in the manner about to be described.

In both forms of FIGURES 1–10, the cables 128 and the support members 134 cooperate with special prop devices 150 permanently located at the respective forward corners 152 of the vehicle 10.

The conveyor 38 is in the form of a lower upwardly inclined section 280 that includes the belt 39 and an upper generally horizontal section 282 (comprising a similar conveyor belt 39A), in which the conveyor section 282 is supported in any suitable manner on cross bar 312 that connects the supports 136 on either side of mechanism 135, and is pivotally connected to conveyor section 280 (as at 317), which at its lower end rides on rollers 281 as cross bar 312 moves up and down.

In practicing my invention, the mail bags are brought in any suitable manner to the area of the conveyor 38 and they may be piled at random adjacent the conveyor 38 for ready access by one or more workers stationed adjacent the conveyor 38 for purposes of controlling the operation of same and carriages 40 or 40A. In accordance with this invention, the controls for conveyor 38 and carriages 40 or 40A (including conveyor 43 of carriage 40A) are arranged so that these pieces of apparatus are operated without anyone having to go into the vehicle 14, as will be hereinafter described in connection with the embodiment of the invention illustrated in the drawings. For this purpose, the controls may be of the push button type applied to suitable control panel 35 and may be of any suitable electric and/or electronic type that will serve the purpose.

To practice my invention, after the vehicle 14 is positioned as shown in FIGURES 1 and 2 for loading (assuming it is empty), the cables 128, 138 and 140 are connected as indicated, and the bags to be shipped are disposed, for instance in a pile or piles adjacent the conveyor 38, the worker or workers in the area of conveyor 38 pick up and position enough of the individual bags 44 to form one or more tiers 46 (of six to eight bags in a tier) on the belt 39 of conveyor 38 section 280 in which, in accordance with the procedure contemplated by this embodiment of the invention, the bags of each tier 46 are placed in closely spaced side by side relation and extend longitudinally of the conveyor 38 and vehicle 14. Assuming the vehicle 14 is empty, cables 128 are lowered to dispose carrier 126 to be no more than 24 inches above the floor 30.

Figure 6:
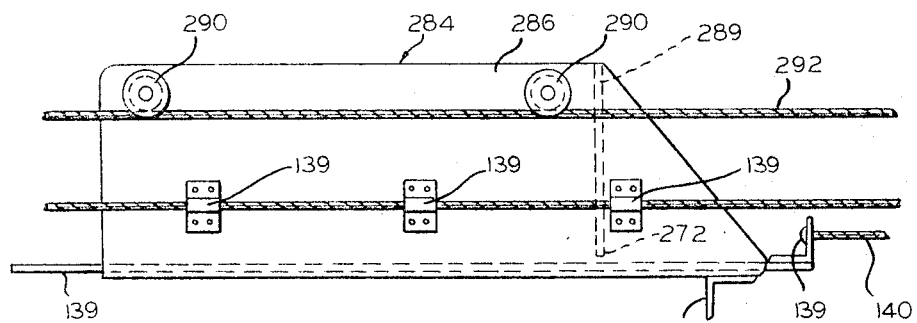
FIGURE 6 is a side elevational view of the carrier shown in FIGURE 5.
Figure 7:
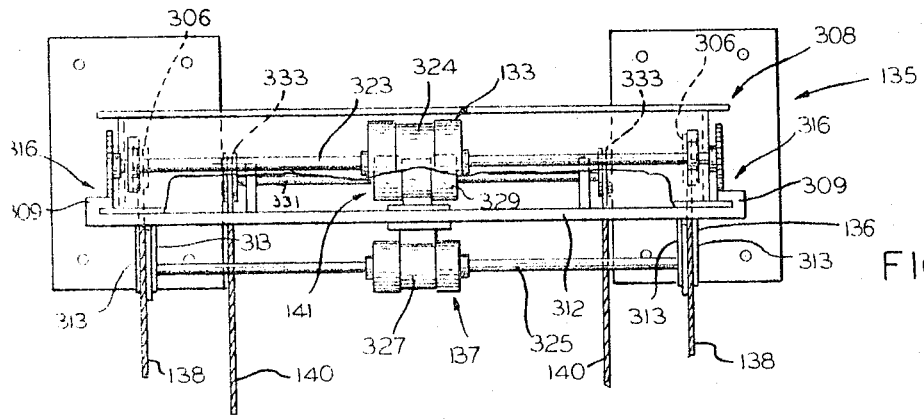
FIGURE 7 is an elevational view on an enlarged scale, of the loading dock mounted cable support frame, taken along line 7—7 of FIGURE 2, with the dock supported conveyor omitted.

When one or more tiers 46 have been applied to conveyor 38 in the manner indicated (which tiers are termed a "partial transport vehicle load depth unit" in the appended claims), the carriage 40 is positioned as suggested by the dashed line showing of FIGURE 1, and the sections of conveyor 38 are actuated to deposit simultaneously all the bags 44 forming the first tier 46 on the carrier 126, its shelf being disposed in its load supporting retracted position of FIGURE 6. It will be noted that the rear end 52 of the carrier 126 will be disposed in load receiving relation with respect to the forward end 54 of the conveyor section 282 when carrier 126 is in its load receiving position of FIGURE 1.

The carriage 40 is then actuated to move same from the dashed line position of FIGURE 1 into the vehicle 14 where it moves toward the front wall 22 of the vehicle to start the first row 58 of mail bags. The carriage 40 moves forwardly of the vehicle 14 until its forward end 50 engages a stop 51 on one of the prop devices 150, which actuates a suitable limit switch arrangement such as that indicated at 56 to stop the forward movement of the carriage 40 and actuate mechanism 141 to move shelf 139 to the bag discharging position of FIGURE 1, whereupon the first tier of bags is dropped onto the floor 30 of the vehicle adjacent the end wall 22 in the position indicated at 58.

The carriage 40 is then returned to the dashed line position of FIGURE 1 to receive the next tier 46 of mail bags 44, which can be formed onto the conveyor 38 while the carriage 40 is operating in the manner that has just been described. Shelf 139 is returned by hand to its load supporting position as carriage 40 returns to its load receiving position and the next tier is transferred to carriage 40 in the manner already suggested. This next tier, in accordance with one manner of practicing my invention is then unloaded in the manner already described, where indicated at 60, the cables 128 and carriage 40 being elevated as required to place the new tier on top of that already in place.

The next tier is stacked similarly to form a completed stack adjacent the wall 22 up to the height desired, after which the stacking process is repeated to form the next adjacent stack carrier 126 being equipped with another limit switch 56A that is similar to switch 56 and is located to engage against one of the tiers 46 already in place to start the rearward cycling of carrier 126. This process is repeated until the vertical stacks of mail bags have been formed the length of vehicle 14, after which the cables 128 are disconnected, carrier 126 rested on dock 12, and cables 128 removed from vehicle 14; cables 138 are disconnected from mechanism 135 and their free ends inserted into the vehicle. The vehicle open end 32 is then secured in the usual manner and the vehicle 14 driven off to be replaced by a similar vehicle 14 to be loaded and carrying similar equipment to that illustrated, with the cables 128 and 138 being applied thereto in the manner indicated to start the loading procedure.

Alternately, the vertical stacks may be formed by consecutively forming horizontally disposed layers 113 of tiers 46, as indicated in FIGURE 1. In doing this, the carriage 40 is maintained at its initial elevation above the floor 30 of vehicle body 14 until the first bag layer 113 is in place between forward wall 22 and door opening 32, after which the carriage 40 is raised, by operating mechanism 133, into a position suitable for forming the next layer 113. This is repeated until the vehicle is filled.

The embodiment of FIGURE 10 is operated following the general procedure described in my said application Ser. No. 694,151 in connection with the embodiment of FIGURES 6 and 7 thereof, except for the changing of elevations of the carriage of same, which is done in the manner hereindisclosed.

The handling of the bags in moving them from the conveyor 38 to their respective positions in the vehicle 14 is thus carried out after having made a single orientation of the bag as to the position it is to take in a particular stack forming tier, and without having to drop the bag over the 24 inch limitation provide for by the Post Office regulations.

From the description so far there are several important features to be observed. Note for one thing that the bags 44 are properly oriented in their tiers 46 by their application to the conveyor 38, and that this orientation is maintained throughout the further handling of the bags that moves them into stacked relation in the vehicle 14. Furthermore, the lifting and positioning of the bags 44 onto conveyor 38 is the only manual labor involved, and the worker is concerned with only an easy lifting and positioning action at a convenient working height above surface 16, with such action needing only to be performed once per bag.

It is also to be noted that the loading of the vehicle 14 is done without anyone having to enter the vehicle 14, and palletizing of the individual tiers 14 is unnecessary.

SPECIFIC DESCRIPTION

The carrier 126 comprises a frame 284 including side plates 286, a cross bar 288 and a bag stop plate 289 fixed together in any suitable manner to define an essentially open centered frame 287 as well as a slideway 285 for the slide plate 139 that is pulled from the position of FIGURE 6 to the position of FIGURES 1 and 2 to discharge the mail bag tier 46 that is carried thereby onto the stack on which it is to be placed. Side plates 286 are angled inwardly as at 270 to support plate 139, and stop plate 289 extends short of slideway 285, as at 272.

The side plates 286 on the outwardly facing sides thereof each journal a pair of rollers 290 that ride on the upper run 292 of the closed loop cable 128. Cable 128 has its ends closed together to form the indicated closed loop 293 about pulleys 130 and 132 by an appropriate quick disconnect device (not shown) so that when loading is completed and the carriage 40 is disposed outside the the vehicle 14, the cable 128 may have its ends disconnected and withdrawn from the vehicle.

The prop devices 150 for the respective cables 138 and movable supports 134 each comprise a suitable post member or bar 300 that is preferably quadrilateral in transverse cross-sectional configuration and is provided at its upper end with a bracket structure 302 that journals a pulley 304 over which the cable 138 is trained (on the respective sides of the vehicle). The bars 300 are secured in any suitable manner to the truck at a bracket structure 305 at their lower ends and at the bracket structure 302.

The cables 138 are connected to the respective supports 134 as at 306 and extend upwardly about the pulleys 304 and then to the rear of the vehicle about a pulley 306 (see FIGURES 7–9) carried by U-shaped support structure or frame 308 (of mechanism 135) that is mounted on the loading dock 12 in overlying relationship to the conveyor 38. From the pulley wheel 306 on either side of the support structure 308 the respective cables 138 proceed about a second pulley 310 and then have their ends 311 detachably anchored in any suitable manner to cross bar 312 which carries the respective supports 132 and conveyor section 282. The cross bar 312 moves vertically and includes a hooked end portion 309 at either end thereof which ride along the respective trackways 316 defined by the respective uprights 314 of structure 308.

Conveyor section 280 of conveyor 38 is in the form of a frame 202 including side members 204 and 206 in which are journalled the rollers 208 that support the belt conveyor 39. Belt conveyor 39 is driven by a suitable electric motor 205 supported on a suitable bracket plate 207 carried adjacent the conveyor rearward end pulley and driving same through a pulley belt or the like. Conveyor section 282 is similarly arranged, it comprising a frame 202A including side members 204A and 206A in which are journalled the rollers 208A that support belt conveyor 39A, which is driven by suitable motor 205A suitably supported on frame 202A and coupled in any suitable manner to the rear end pulley of conveyor 39A. Frame 202A is mounted on suitable supports 209 (see FIGURE 9) secured to cross bar 312 in any suitable manner (on either side of mechanisms 137 and 141) and suitably connected to brace plate 221 fixed to frame 202A.

The conveyor 38 section 280 at its lower end rides on rollers 281 as the cross bar 312 moves up and down. Rollers 281 are journaled on frame 202D of section 280 in any suitable manner.

On either side of the support 308, the cross bar 312 is connected at its end portions 309 to an endless chain 318 trained over sprockets 320 and 322 (see FIGURE 9), with the sprockets 322 being keyed to a shaft 323 journaled on frame 308 and driven by a suitable electric motor 324 comprising mechanism 133. Operation of the motor 324 in either direction serves to actuate cross bar 312 and simultaneously raise and lower the supports 134 and 136 as required to facilitate the stacking of the mail bags. Supports 136 are fixed to cross bar 312 in any suitable manner and in the form shown, each comprises a pair of spaced plates 313 between which the respective pulleys 132 are journaled.

The end pulleys 132 are keyed to a shaft 325 driven by a motor 327 carried on cross bar 312 (and comprising mechanism 137), and cables 128 are tensioned suitably so that the carriage 40 is moved mechanically by operating motor 327, and a similar motor 329 (comprising mechanism 141) carried by cross bar 312 operates a shaft 331, journaled on bar 312 and having reels 333 keyed thereto to which cables 140 are respectively attached for pulling cables 140 (under the action of motor 329) to retract the slide plate or shelf 139 when unloading of the mail bags from the carriage 40 is desired, with the drive for the latter motor being arranged so that cables 140 pull out readily from their reels (without displacing shelf 139) when the carriage 40 is moved toward the desired bag tier load discharging position. This may be done in any suitable manner. Cables 140 are suitably anchored to slide plate or shelf 139 as at 139A.

After the vehicle 14 is loaded, carriage 40 is moved so that it is disposed over the loading dock 12, after which the ends of cables 128 are disconnected and the cables 128 withdrawn from vehicle 14. The ends 311 of cables 138 are disconnected and untrained from pulleys 306 and 310 for placing inside of vehicle 14, after which the doorway 32 is closed and the vehicle driven away. A vehicle 14 similarly equipped is backed into place and the cables 128 and 138 replaced to the positions illustrated for further loading of mail bags.

The conveyor 43 of FIGURE 10 comprises a suitable frame 180 including side plates 182 joined together in any suitable manner that journal rollers 184 that support conveyor belt 47. Belt conveyor 47 is driven by a suitable electric motor 186 that drives the conveyor and pulley through suitable pulley belt 188, and is carried by support plate 185 that is fixed to frame 180.

In the embodiment of FIGURE 10, the conveyor side plates 182 include the lug devices 127A at which the carriage 40A is fixed to the cable 128, as well as upstanding bag guide plates 182A. The conveyor frame guide plates 182A have journalled thereon the rollers 240 that ride on the upper run 292 of cable 128.

The operation and movements of the conveyors and bag carrying carriage and parts thereof are preferably completely controlled from a control panel 35, or the like, located outside of the vehicle, through any suitable wiring arrangement that incorporates the various motors and switches that have been referred to, and ordinarily only a single operator will be needed to both load the bags on the dock supported conveyor 38 and operate the machines involved to deposit the bags in the vehicle 14. The machines involved can readily be controlled to avoid dropping the bags further than the 24 inch limitation prescribed by the Post Office Department.

The bag stacking arrangement of this invention will load trucks and trailers in a fraction of the time now required and at less than half the cost, while at the same time greatly reducing the effort required by workers handling the bags. This not only greatly reduces the tie up time for each truck, but also significantly reduces the overall cost of mail bag handling.

As to all described embodiments and methods herein disclosed, the load units or tiers formed on the loading dock are termed "partial transport vehicle load depth unit" in the appended claims.

The foregoing description and the drawings are given merely to explain and illustrate my invention since those skilled in the art who have my disclosure before them will be able to make modifications and variations therein without departing from the scope of the invention.

I claim:

1. In bulk mail handling apparatus for loading elongated mail bags from a loading dock into the load receiving area of an end loading transport vehicle backed into load receiving position adjacent the dock to dispose its end opening to receive the bags, without workers on the dock handling the bags having to enter the vehicle, and without requiring that pallets remain with the bags after they are loaded into the vehicle, said apparatus comprising:

a conveyor mounted on the loading dock adjacent the load receiving position of the vehicle and having a width transversely thereof approximately the width of the vehicle area, said conveyor being positioned to be aligned with the vehicle and its end opening in the load receiving position of the vehicle, said conveyor presenting an upwardly facing load transporting surface having at least a portion thereof at an elevation for convenient manual lifting of the bags from the dock onto the conveyor surface, a mail bag receiving carriage adapted to operate between said conveyor and the load receiving position of the vehicle and proportioned to enter said vehicle end opening, said carriage being secured at either side thereof to a closed loop cable, end pulley means carried by the loading dock and the vehicle over which said cables may be trained for suspending said carriage therebetween, said pulley means being mounted for vertical movement, said carriage including a load supporting surface approximating the width of the vehicle area, means for driving said cables for moving said carriage between a mail bag receiving position adjacent said conveyor and predetermined mail bag discharging positions within the vehicle at which time the rear end of the carriage is out of bag receiving relationship to the conveyor, means for simultaneously adjusting vertically said pulley means for adjusting vertically said carriage load supporting surface, and means for discharging from said carriage surface bags received thereon from said conveyor, whereby mail bags may be loaded onto said conveyor surface with the bags thereof oriented to extend longitudinally of the vehicle and in side by side tier forming relation, and said tiers of bags may be mechanically transferred between said conveyor surface and stack forming positions in said vehicle area while maintaining said orientation.

2. The apparatus set forth in claim 1 wherein said means for vertically adjusting said end pulley means comprises:
an actuating cable anchored adjacent one end thereof to the vehicle mounted end pulley means of the respective closed loop cables,
said actuating cable extending rearwardly of the vehicle for training over intermediate pulley means to dispose the other end thereof under the loading dock mounted pulley means of the respective closed loop cables for connection thereto, and
means for mechanically raising and lowering said loading dock mounted pulley means of the respective closed loop cables to simultaneously raise and lower the respective end pulley means and the closed loop cables carried thereby.

3. The apparatus set forth in claim 2 including:
a vertical frame mounted on the loading dock in alignment with the path of movement of said carriage, with said frame defining a vertical trackway,
a cross bar riding in said trackway and having said loading dock supported end pulley means fixed thereto and power means for raising and lowering said cross bar and comprising said mechanically raising and lowering means.

4. The apparatus set forth in claim 3 wherein:
said conveyor comprises a first endless conveyor section carried by said cross bar and a second endless conveyor section extending rearwardly thereof with respect to the vehicle load receiving position and having one end thereof pivotally connected to said first conveyor section in load transmitting relation thereto and the other end thereof riding on the loading dock.

5. The apparatus set forth in claim 1 wherein:
said carriage load supporting surface comprises a shelf member mounted for movement between a mail bag tier load supporting position and a load discharging position, and
means for mechanically moving said shelf member between said positions.

6. The apparatus set forth in claim 1 wherein:
said carriage load supporting surface comprises an endless conveyor, and
means for actuating said conveyor to unload the mail bag tier carried thereby.

7. In bulk mail handling apparatus for loading elongated mail bags from a loading dock into the load receiving area of an end loading transport vehicle backed into load receiving position adjacent the dock to dispose its end opening to receive the bags, without workers on the dock handling the bags having to enter the vehicle, and without requiring that pallets remain with the bags after they are loaded into the vehicle, wherein said apparatus includes a mail bag receiving carriage horizontally shiftable between a conveyor on the loading dock on which a partial transport vehicle load depth unit may be formed and to positions within the vehicle for depositing such load units so as to form stacks in the vehicle load receiving area, and wherein the carriage is supported between cables temporarily suspended between the loading dock and the vehicle, the improvement wherein:
the transport vehicle at its forward end of its load receiving area includes a prop structure at both corners thereof,
said prop structures comprising:
an upright member fixed to the vehicle and having a pulley journalled on the upper end thereof, and
a floating support riding on said member and carrying a pulley journalled thereon,
said pulleys being disposed to have their axes of rotation in parallelism and extend transversely of the vehicle, and
a cable having one end thereof anchored to said floating support and extending over the first mentioned pulley for extension to the rear of the vehicle for cooperation with loading dock mounted cable actuating mechanisms, and wherein, in operation, said carriage supporting cables are reeved about the pulleys journalled in said floating supports and pulleys mounted on the loading dock.

References Cited

UNITED STATES PATENTS

| | | |
|---|---|---|
| 2,870,922 | 1/1959 | Thomson. |
| 3,224,379 | 12/1965 | Miller _____ 214—13 X |
| 3,337,066 | 8/1967 | Reed et al. _____ 214—38.4 |

GERALD M. FORLENZA, Primary Examiner

R. J. SPAR, Assistant Examiner

U.S. Cl. X.R.

214—41, 75